(12) United States Patent
Whited et al.

(10) Patent No.: US 8,488,582 B2
(45) Date of Patent: Jul. 16, 2013

(54) MINIMAL GAN RTP PACKET LENGTH VIA MULTI-LEVEL HEADER COMPRESSION

(75) Inventors: John Whited, Richardson, TX (US); Vilat Keomoungkhoun, Plano, TX (US); Nicolas Drevon, Paris (FR)

(73) Assignee: Alcatel Lucent, Paris (FR)

( * ) Notice: Subject to any disclaimer, the term of this patent is extended or adjusted under 35 U.S.C. 154(b) by 993 days.

(21) Appl. No.: 12/157,619

(22) Filed: Jun. 12, 2008

(65) Prior Publication Data

US 2009/0310622 A1    Dec. 17, 2009

(51) Int. Cl.
*H04J 3/24* (2006.01)

(52) U.S. Cl.
USPC .......................................... 370/349; 370/470

(58) Field of Classification Search
USPC ......................................... 370/376, 349, 470
See application file for complete search history.

(56) References Cited

U.S. PATENT DOCUMENTS

| 2004/0103277 | A1* | 5/2004 | Seada et al. ................. 713/160 |
| 2004/0125793 | A1* | 7/2004 | Yi et al. ........................ 370/352 |
| 2006/0094427 | A1* | 5/2006 | Buckley et al. .............. 455/434 |
| 2008/0254833 | A1* | 10/2008 | Keevill et al. ............... 455/558 |
| 2009/0086707 | A1* | 4/2009 | Meylan ........................ 370/349 |
| 2010/0027497 | A1* | 2/2010 | Pelletier ...................... 370/329 |

OTHER PUBLICATIONS

Huttunen et al. : UDP Encapsulation of IPSec ESP Packets (Jan. 2005).*

* cited by examiner

*Primary Examiner* — Sai-Ming Chan
(74) *Attorney, Agent, or Firm* — Hitt Gaines, PC

(57) ABSTRACT

The present invention involves a method for IP header compression for Real-Time Transport Protocol (RTP) packets that includes header compression for the outer IP layer that carries IPsec ESP tunnel traffic. The preferred embodiment of the invention involves a method of producing minimal VoIP packet size in a GAN user plane by defining an ESP/UDP/IP profile for ROHC; using the ESP/UDP/IP profile to compress the outer layers carrying IPsec ESP tunnel traffic in the GAN user plane; and using a ROHC RTP/UDP/IP profile between IPsec ESP tunnel endpoints for additional compression.

11 Claims, 2 Drawing Sheets

US 8,488,582 B2

MINIMAL GAN RTP PACKET LENGTH VIA MULTI-LEVEL HEADER COMPRESSION

CROSS REFERENCE TO RELATED APPLICATIONS

This United States non-provisional patent application does not claim priority to any United States provisional patent application or any foreign patent application.

FIELD OF THE DISCLOSURE

The disclosures made herein relate generally to compression techniques for transmission of packets on the internet. More specifically, the invention described herein involves a method for Internet Protocol (IP) header compression for Real-Time Transport Protocol (RTP) packets that includes header compression for the outer IP layer that carries IPsec ESP tunnel traffic.

BACKGROUND

The internet is actually a group of interconnected networks. Messages between computers are exchanged over the internet by using packet switching. Different networks use a protocol to allow them to communicate with one another.

IP specifies the format of IP packet headers as they travel through the network. Routers utilize routing tables to send data packets through the network from node to node. Every computer on the internet has a unique address. IP attaches to the data packet the address from which the data comes and the address of the system to which it is going in a protocol header.

For many years, it has been recognized that repetitive transmission of similar packets over IP bears an unnecessary overhead in the IP and other headers. This is because many fields never change, others rarely change, and still others increase sequentially by the same amount. Various IP header compression techniques have been proposed to deal with this issue, especially when the IP payload is RTP packets carrying Voice-over-IP (VoIP) speech samples.

Header compression is utilized to compress the IP header in a data packet before it is transmitted. This compression mechanism expedites transmission of RTP packets and Transmission Control Protocol (TCP) packets and minimizes the amount of bandwidth consumed during transmission of RTP packets and TCP packets.

RTP has a header portion and a data portion. The data portion provides support for the real-time properties of applications. The header portion is comprised of the IP segment, the User Datagram Protocol (UDP) segment, and the RTP segment, making it considerably larger than the data portion of the RTP. Due to its size, the IP/UDP/RTP segment combination is often compressed prior to sending. RTP header compression is done on a link-by-link basis to avoid consumption of bandwidth. RTP header compression is particularly useful when there is a high portion of RTP traffic. RTP header compression can be used for media-on-demand, interactive services and real-time conferencing within the internet.

For audio applications, for example, a RTP packet usually has a twenty to one hundred and twenty-eight byte payload. RTP header compression identifies the RTP traffic and compresses the portion of the packet consisting of the IP segment, the UDP segment and the RTP segment. A twenty byte IP segment, eight byte UDP segment and twelve byte RTP segment can be compressed from a forty byte header to approximately five bytes.

Robust Header Compression (ROHC) is a method for compressing IP, UDP, RTP and TCP headers. This method of compression is preferable over wireless links where the packet loss rate is usually high. The overhead associated with IP, UDP and RTP requires large bandwidth which is not present in wireless links.

Internet Engineering Task Force (IETF) Request for Comments (RFC) 3095 is an example of a proposed means of compressing the redundant IP, UDP, and RTP headers that are present in many VoIP streams. RFC's are documents describing new research and inventions involving internet technologies. The IETF adopts some of these RFCs as new internet standards.

RFC 3095 attempts to address issues such as channel negotiation, error recovery in the presence of high bit error rates, and other pragmatic issues that arise in actual IP networks. The IETF has furthered this work by forming a ROHC Working Group (WG).

Traditionally, because the IP header is involved, and because the IP header must be present for end-to-end routing at the network (layer 3) level, IP header compression techniques have focused on point-to-point links (layer 2) only. The IETF ROHC WG published a document, "draft-ietf-rohc-hcoipsec-03" (Oct. 22, 2006), authored by contributors from the Booz Allen Hamilton consulting firm. This document discusses a method of carrying compressed headers within the Internet Protocol Security (IPsec) Encapsulating Security Payload (ESP) tunnel used by Generic Access Network (Unlicensed Mobile Access)/(GAN(UMA)). The name given to this technique by the authors is Header Compression over IPsec (HCoIPsec). However, a single application of this type of header compression does not give minimal RTP/ESP header size.

Generally, IPsec tunnels mask source-destination patterns but create increased packet overhead in the process. ESP tunnel mode Security Association (SA) can easily create at least 50 additional bytes of overhead per packet which creates problems on wireless networks with lower bandwidth.

HCoIPsec reduces the protocol overhead for packets traveling between IPsec SA endpoints by compressing the transport layer header, such as UDP and TCP, and inner IP header packets at the ingress of the IPsec tunnel and decompressing these headers at the egress. A full description of the method is discussed in the "draft-ietf-rohc-hcoipsec-03" memo previously mentioned and is incorporated herein by reference.

IPsec is a suite of protocols for making IP communications secure. IPsec secures IP communications by encrypting and authenticating IP packets. It is currently employed both on IPv6 and IPv4. However, it is merely optional for IPv4 and is only mandatory to implement, not to use, on IPv6. IPsec provides either transport mode security for packets in which end-point computers process security or tunnel mode security for packets in which a single node provides security to multiple computers. In transport mode, the payload of the IP packet but not the IP header is encrypted. In tunnel mode, the entire IP packet, including IP headers, is encrypted.

The ESP protocol provides protection of a packet by insuring authenticity and confidentiality. In tunnel mode ESP, the inner header is protected but not the outer header.

HCoIPsec is used in the application of header compression to tunnel mode SAs since transport mode SAs only encrypt the payload of an IP packet while leaving the IP header untouched. Since compression of transport layer headers does not provide significant bandwidth efficiency benefits, HCoIPsec is applicable to and beneficial in tunnel mode.

There is, however, still a need in the art for a convenient to implement, reliable, inexpensive and efficient method for IP header compression for RTP packets that includes header compression for the outer IP layer that carries IPsec ESP tunnel traffic.

SUMMARY OF THE DISCLOSURE

The preferred embodiment of the invention involves a method for IP header compression for RTP packets that includes header compression for the outer IP layer that carries IPsec ESP tunnel traffic by defining and using a new ROHC profile.

The principal object of this invention is to provide a method for IP header compression for RTP packets that includes header compression for the outer IP layer that carries IPsec ESP tunnel traffic.

Another object of this invention is to provide a method for IP header compression for RTP packets that combines the header compression for the outer IP layer that carries IPsec ESP tunnel traffic by defining and using a new ROHC profile with the known methods for header compression for the inner IP layer.

Another object of this invention is to provide a method to reduce GAN (UMA) packet length to maximize bandwidth.

Another object of this invention is to provide a method to minimize end-to-end delay in transmission times through the use of a multi-level header compression.

Another object of this invention is to provide a method that is relatively inexpensive to implement and maintain for IP header compression for RTP packets that includes header compression for the outer IP layer that carries IPsec ESP tunnel traffic.

Another object of this invention is to provide a reliable method for IP header compression for Real-Time Transport Protocol RTP packets that includes header compression for the outer IP layer that carries IPsec ESP tunnel traffic.

Yet another object of the invention is to provide an efficient method for IP header compression for RTP packets that includes header compression for the outer IP layer that carries IPsec ESP tunnel traffic.

DETAILED DESCRIPTION OF THE DRAWINGS

Figure 1:
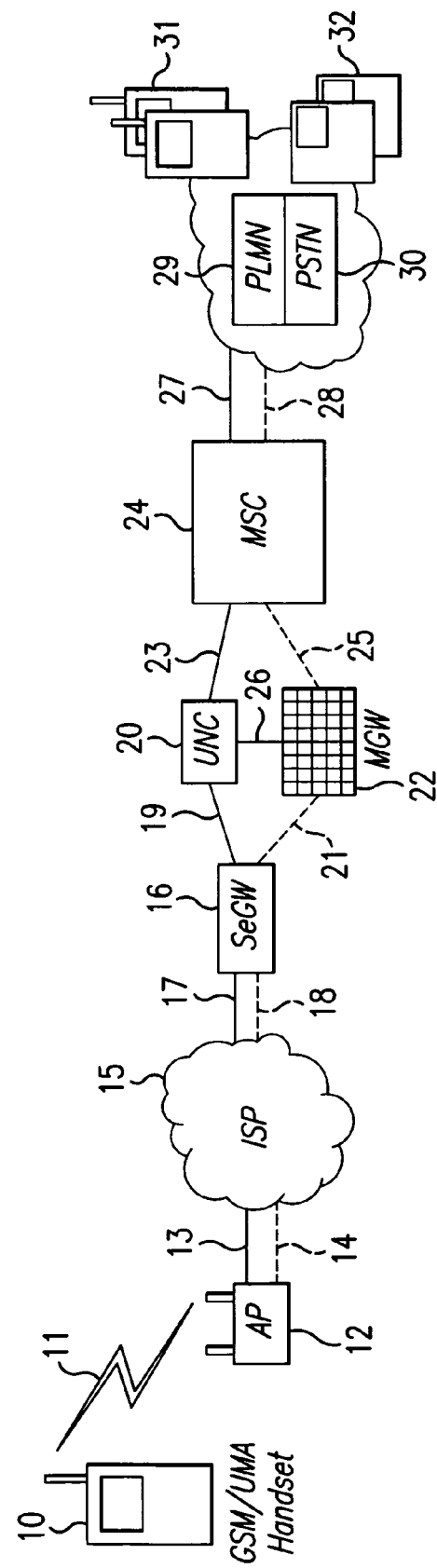
FIG. 1 depicts certain application points in a network where the preferred method of the invention can be implemented.

FIG. 1 depicts certain application points in a network where the preferred method of the invention can be implemented. The preferred method (Multi-Level Header Compression) provides additional IP header compression for RTP packets (ROHC 3095+) to the HCoIPsec by adding the traditional header compression for the outer IP layer that carries the IPsec ESP tunnel traffic. To accommodate UDP encapsulation as a means of Network Address Translation (NAT) traversal with ESP (as discussed in IETF RFC 3498), a new ROHC profile is defined for ESP/UDP/IP which includes the outer layer IP segment and outer UDP segment and ESP segment.

This profile is especially useful for the handset-to-access point (AP) WiFi link, where maximum efficiency is needed to reduce bandwidth and support the most simultaneously active GAN handsets served by one WiFi access point. However, Multi-Level Header Compression could be used by other adjacent point-to-point hops within the GAN network to provide additional benefit. For a single ROHC channel between GAN handset and WiFi access point, "single-octet-header" compression can be achieved. There is some initialization and overhead, as well as occasional error correction and other feedback information. However, for most packets, the entire outer header can be reduced to a single octet.

FIG. 1 shows a Global System for Mobile communications/Unlicensed Mobile Access (GSM/UMA) handset 10 sending a Radio Frequency (RF) signal 11 to an AP 12. Typical header compression occurs between the GSM/UMA handset 10 and the AP 12. Multi-Level Header Compression (a combination of ROHC 3095+ (outer layer compression using ESP/UDP/IP profile) and HCoIPsec (inner layer compression using RTP/UDP/IP profile)) also operates between these application points.

GSM is the most widespread standard for mobile phones and enables subscribers to use their phones by allowing international roaming between mobile phone operators. GSM is a cellular network operating in four different frequency ranges.

The AP 12 is a device that serves as a wireless access point. AP 12 forms a wireless network by connecting wireless communication devices together. AP 12 connects to a wired network and can send data between both wireless devices and wired devices.

The AP 12 connects through a signaling interface 13 and a media/bearer path 14 with an Internet Service Provider (ISP) 15. The ISP 15 provides users access to the internet. The ISP 15 further connects to a Services Security Gateway (SeGW) 16 via another signaling interface 17 and another media/bearer path 18. The HCoIPsec portion of Multi-Level Header Compression of the present invention operates between the GSM/UMA handset 10 and the SeGW 16.

SeGW 16 has a signaling interface 19 with the UMA Network Controller (UNC) 20 and a media/bearer path 21 with MGW 22. MGW 22 is an IP streaming gateway that allows transmission and receipt of video and other data.

The UNC 20 has a signaling interface 23 with the MSC 24 while the MGW 22 has a media/bearer path 25 between it and the MSC 24. The UNC 20 and the MGW 22 are also connected via a signaling interface 26.

The MSC 24 has a signaling interface 27 and a media/bearer path 28 with a Public Land Mobile Network (PLMN) 29 and Public Switched Telephone Network (PSTN) 30. The PLMN 29 is a network that is established and operated by an administrator to provide land mobile telecommunications services to the public. PLMNs connect with other PLMNs and PSTNs for telephone communications or with internet service providers for data and internet access. The PLMN 29 is a wireless communications system that is connected with the fixed PSTN 30. An end user of the PLMN 29 is cellular phone 31 and the end user of the PSTN 30 is fixed phone 32.

Figure 2:
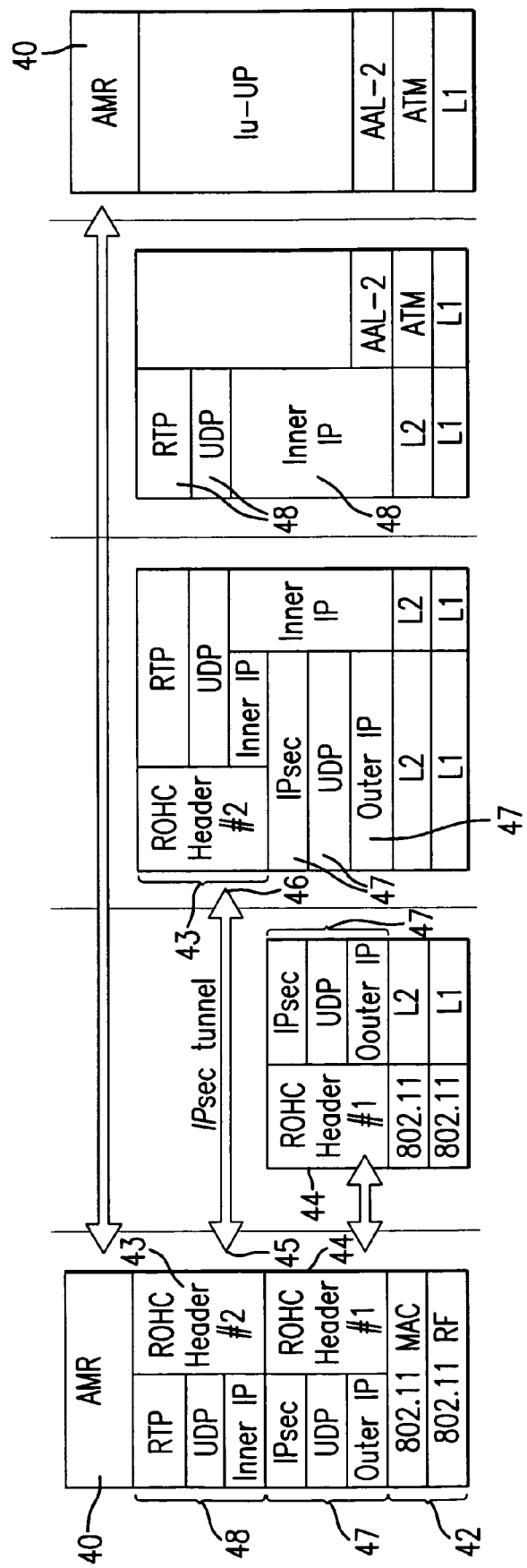
FIG. 2 depicts an Adaptive Multi-Rate (AMR) packet with inner and outer layers being compressed and decompressed utilizing the preferred method of the invention.

FIG. 2 depicts an AMR packet with inner and outer layers being compressed and decompressed utilizing the preferred method of the invention. An AMR is an audio data compression scheme for speech coding and storing audio.

With a single (no redundancy) AMR packet 40 (12.2 kbps speech frame per packet), and assuming a twenty msec sample size, the payload consumes a total of thirty-three octets (one octet for AMR header, since interleaving is not used by GAN, one octet for AMR table of contents, and thirty-one octets to hold the 244-bit AMR speech frame plus four bits for octet alignment). A nominal WiFi header 42 of thirty-six octets is also assumed (802.3 LLC with SNAP but w/o VLAN header, over 802.11 w/o 802.11e extensions). Prior to using the RTP/UDP/IP profile (ROHC Header #2) 43, the RTP/UDP/IP segments consume forty octets while the ESP/UDP/IP segments consume an additional twenty-eight to thirty-six octets prior to using the ESP/UDP/IP profile (Header #1) 44.

With the use of the ESP/UDP/IP profile/ROHC Header #1 44, compression (ROHC 3095+) causes a reduction in size in the outer layer from twenty-eight octets to one octet for ESP/IP. If UDP encapsulation is needed as a means of NAT traversal, and if outer UDP checksums are disabled, the reduction is from thirty-six octets to one octet. These reductions occur between the GSM/UMA handset and the AP. The ESP/UDP/IP segments 47 are compressed at the GSM/UMA handset and decompressed before they leave the AP.

When end-to-end IPsec ESP tunnel header compression (HCoIPsec) is added, all traffic between the tunnel endpoints 45 and 46 can reduce the inner layer payload from forty octets to one octet (with inner UDP checksums disabled). This reduction occurs between the GSM/UMA handset and the SeGW. The RTP/UDP/IP segments 48 are compressed at the GSM/UMA handset and decompressed before they leave the SeGW and travel along the network to the end user.

This results in a cumulative reduction over the WiFi link from at least 68 octets to 2 octets (no UPD encapsulation) and possibly seventy-six octets to two octets (with UDP encapsulation) with the use of Multi-Level Header Compression (a combination of ROHC 3095+ and HCoIPsec).

The AMR packet 40 payload of thirty-three octets and the WiFi header 42 of thirty-six octets are not compressed in this preferred embodiment as they travel from the GSM/UMA handset to an end user such as a fixed phone or mobile phone.

While the HCoIPsec reduction in size of the prior art is admirable (less than one-third), the use of multi-level header compression shows an improvement to around 50% or better. The savings of total frame size for various header compression techniques discussed above is shown in the table below:

| RTP Packet Frame Structure | ROHC 3095+ Only | HCoIPsec Only | Multi-Level Header Compression |
|---|---|---|---|
| ESP/IP/ 802.3/802.11 | 137 − (28 − 1) → 19.71% | 137 − (40 − 1) → 28.47% | 137 − (27 + 39) → 48.18% |
| ESP/UDP/ IP/802.3/ 802.11 | 145 − (36 − 1) → 24.14% | 145 − (40 − 1) → 26.90% | 145 − (35 + 39) → 51.03% |

It is contemplated that the method described herein can be implemented as software, including a computer-readable medium having program instructions executing on a computer, hardware, firmware, or a combination thereof. The method described herein also may be implemented in various combinations on hardware and/or software and may be implemented between a variety of points on a network.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method of producing reduced packet size in a Generic Access Network (GAN) user plane comprising the steps of:
   (a) defining an Encapsulating Security Payload (ESP)/User Datagram Protocol (UDP)/Internet Protocol (IP) profile for Robust Header Compression (ROHC); and
   (b) using the ESP/UDP/IP profile to compress an outer IP segment of a packet carrying Internet Protocol Security (IPsec) ESP tunnel traffic in the GAN user plane at a device;
   (c) using a Real-time Transport Protocol (RTP)/UDP/IP profile for ROHC between an ingress IPsec ESP tunnel endpoint and an egress IPsec ESP tunnel endpoint for additional compression of the packet including compressing an inner IP segment at said device while the ESP/UDP/IP profile is used to compress the outer IP segment of the packet;
   wherein said outer IP segment is decompressed before it leaves a wireless access point and said inner IP segment is decompressed before it leaves a Services Security Gateway (SeGW).

2. The method of claim 1 further comprising the step of:
   using the ESP/UDP/IP profile to compress an outer UDP segment of the packet.

3. The method of claim 1 further comprising the step of:
   using the ESP/UDP/IP profile to compress an ESP segment of the packet.

4. The method of claim 1 utilized between said device and said wireless access point.

5. The method of claim 1 utilized between said device and said SeGW.

6. A method of producing reduced packet size in a Generic Access Network (GAN) user plane comprising the steps of:
   (a) defining Encapsulating Security Payload (ESP)/User Datagram Protocol (UDP)/Internet Protocol (IP) profile for Robust Header Compression (ROHC);
   (b) using the ESP/UDP/IP profile to compress an outer UDP segment, ESP segment and an outer IP segment of a packet carrying Internet Protocol Security (IPsec) ESP tunnel traffic in the GAN user plane at a device; and
   (c) using a Real-time Transport Protocol (RTP)/UDP/IP profile for ROHC between an ingress IPsec ESP tunnel endpoint and an egress IPsec ESP tunnel endpoint for additional compression of the packet;
   wherein said outer IP segment is decompressed before it leaves a wireless access point and said inner IP segment is decompressed before it leaves a Services Security Gateway (SeGW).

7. The method of claim 6 utilized between said device and said wireless access point.

8. The method of claim 6 utilized between said device and said SeGW.

9. A method of producing reduced packet size in a Generic Access Network (GAN) user plane between a Global System for Mobile communications (GSM)/Unlicensed Mobile Access (UMA) handset and an AP comprising the steps of:
   (a) defining Encapsulating Security Payload (ESP)/User Datagram Protocol (UDP)/Internet Protocol (IP) profile for Robust Header Compression (ROHC);
   (b) using the ESP/UDP/IP profile to compress an outer IP segment of a packet carrying Internet Protocol Security (IPsec) ESP tunnel traffic in the GAN user plane at said GSM/UMA hand set; and
   (c) using an Real-time Transport Protocol (RTP)/UDP/IP profile for ROHC between an ingress IPsec ESP tunnel endpoint and an egress IPsec ESP tunnel endpoint for additional compression of the packet;

wherein said outer IP segment is decompressed before it leaves a wireless access point and said inner IP segment is decompressed before it leaves a Services Security Gateway (SeGW).

10. The method of claim 1, wherein said device is a Global System for Mobile communications (GSM)/Unlicensed Mobile Access (UMA) handset.

11. The method of claim 6, wherein said device is a Global System for Mobile communications (GSM)/Unlicensed Mobile Access (UMA) handset.

* * * * *